Figure 5:
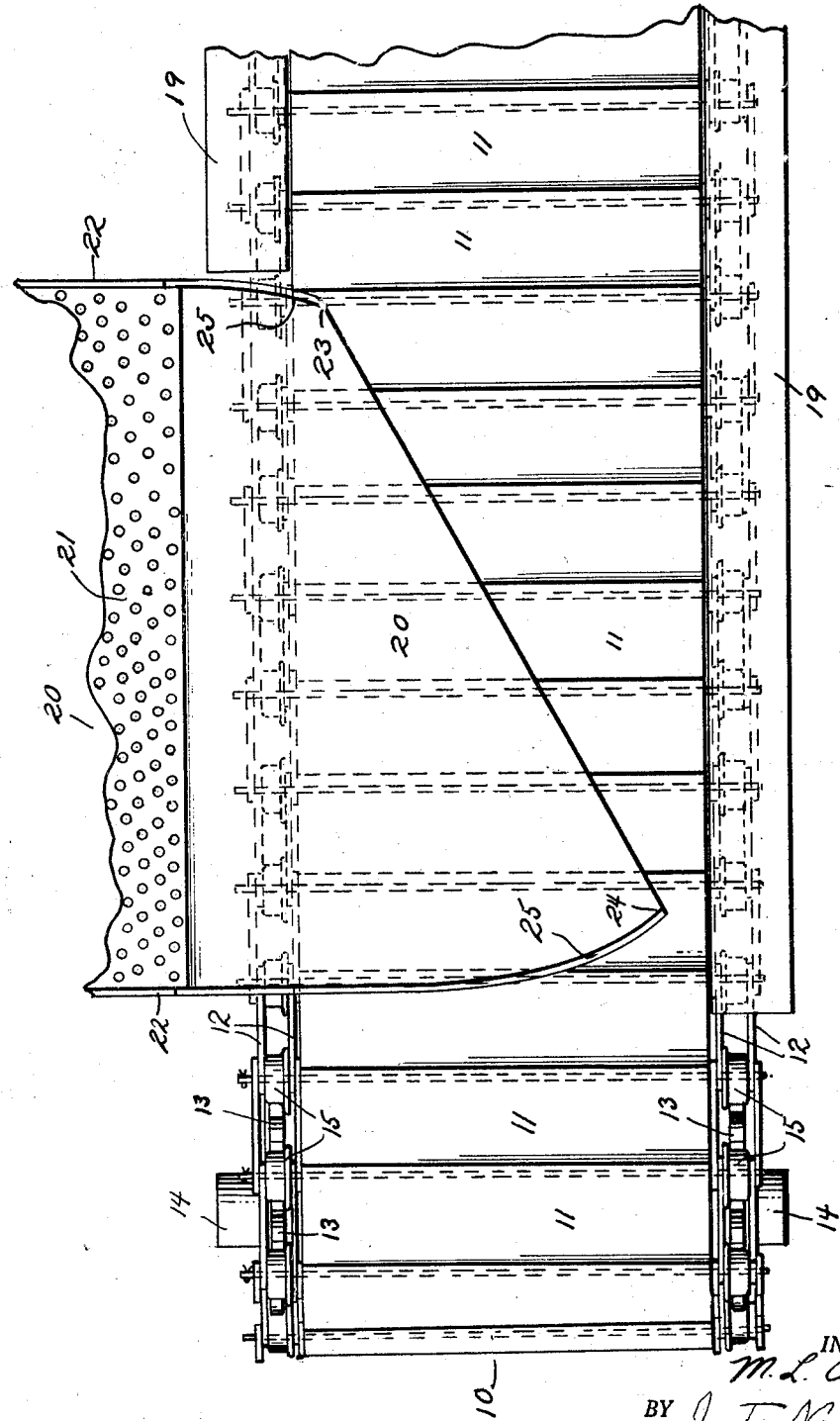

Sept. 23, 1930.     M. L. O'NEALE     1,776,568
CONVEYING APPARATUS
Filed July 31, 1928      3 Sheets-Sheet 1
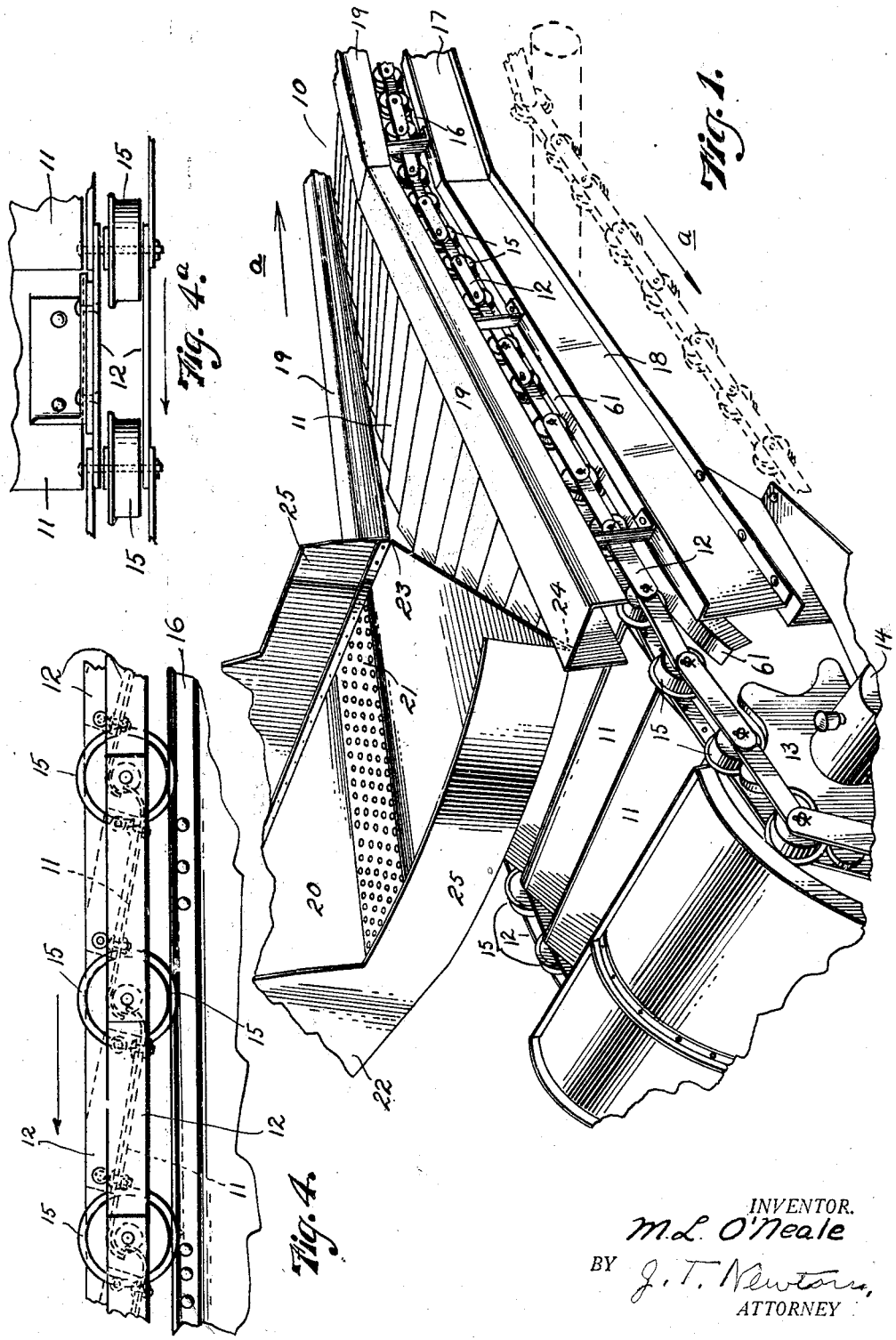

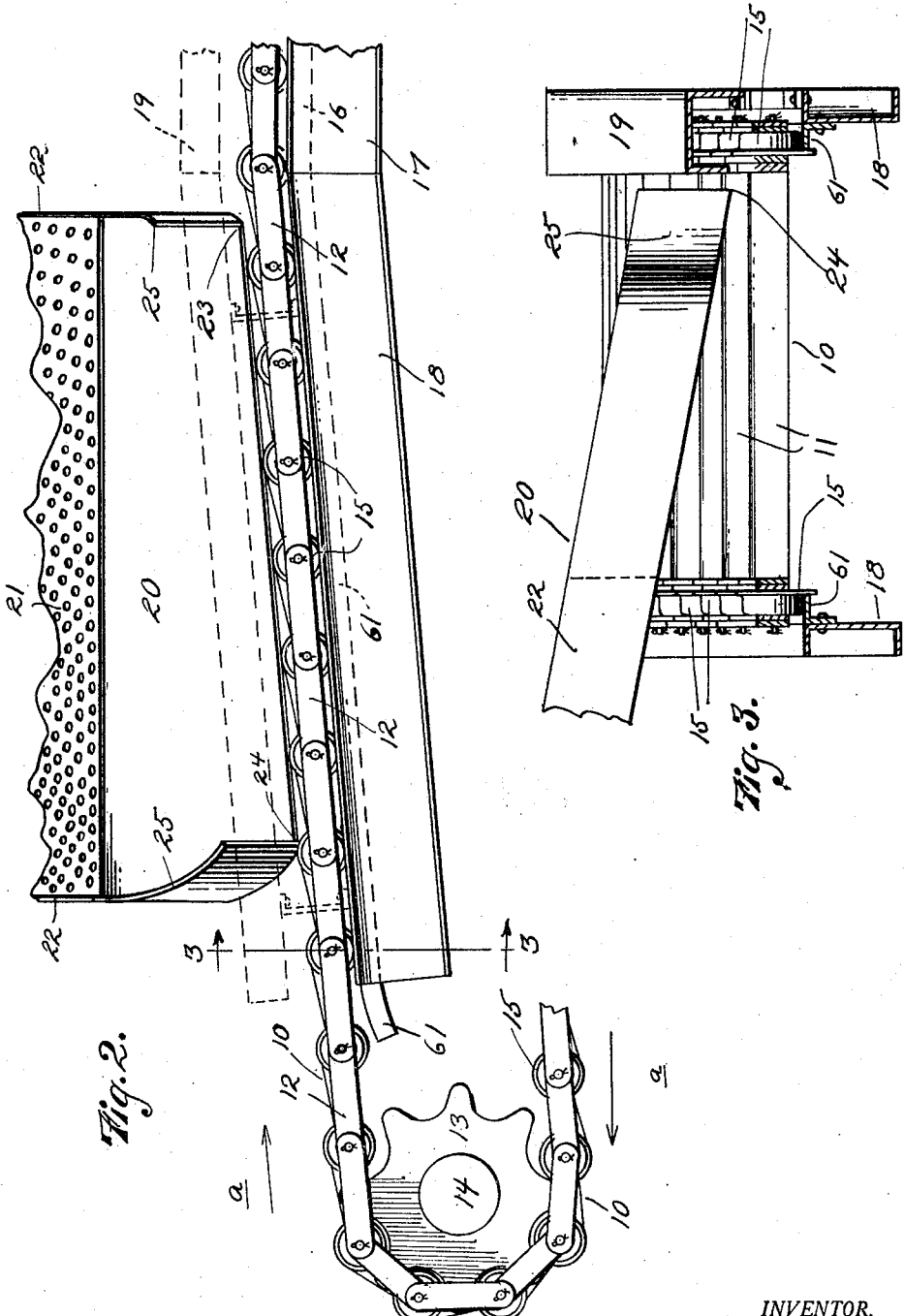

Sept. 23, 1930.  M. L. O'NEALE  1,776,568
CONVEYING APPARATUS
Filed July 31, 1928  3 Sheets-Sheet 3

INVENTOR.
M. L. O'Neale
BY J. T. Newton,
ATTORNEY

Patented Sept. 23, 1930

1,776,568

UNITED STATES PATENT OFFICE

MALCOLM L. O'NEALE, OF FAIRMONT, WEST VIRGINIA, ASSIGNOR TO FAIRMONT MINING MACHINERY COMPANY, OF FAIRMONT, WEST VIRGINIA, A CORPORATION OF WEST VIRGINIA

CONVEYING APPARATUS

Application filed July 31, 1928. Serial No. 296,574.

This invention relates to improvements in power-driven conveying apparatus of that type which includes an active conveyer in combination with a chute, such as is employed in mine equipment for handling coal. In the mine apparatus the chute generally includes a screen or a separator for removing the fine material or separating the lumps; the chute feeds by gravity onto the active conveyer, which generally operates in a horizontal plane to carry the coal so that it can be readily inspected by the slate-pickers and also to convey the coal to a place of deposit. In the mine equipment the paths of travel of the chute and the active conveyer are normal to each other, the chute being inclined to feed onto the conveyer. To distribute the coal over the entire width of the conveyer, the discharge end of the chute projects across the conveyer and its lip is designed to extend diagonally across the intersecting planes of the chute and conveyer; that is, the discharge lip of the chute is in a line that is inclined about forty-five degrees to the longitudinal axes of both the chute and the conveyer. By designing the discharge end of the chute in this manner the chute opens onto the active conveyer in the same direction travelled by the conveyer.

Owing to the inclination of the chute, the oblique discharge lip is inclined relative to the horizontal, the nearer the inclination of the chute approaches the perpendicular the greater becomes the inclination of the discharge lip. With the chute inclined at the angle usually employed in mine equipment and the active conveyer travelling in a horizontal plane adjacent to the lower corner of the chute, considerable space would occur between the conveyer and the upper corner of the chute at its discharge edge, which space decreases toward the opposite lower corner of the chute. If permitted to remain, the open space between the lip of the chute and the active conveyer would be objectionable; in ordinary practice it is obviated by warping the shorter side of the chute toward the active conveyer to close the opening. While this warping of the chute closes the opening, yet it is also objectionable as it greatly increases the declivity of the chute at its shorter side and this tends to accelerate the descent of the coal on that side; also, the greater declivity of the chute at its shorter side causes the coal to flow toward that side and as a consequence there is an uneven distribution of the coal by the chute across the active conveyer. The acceleration in the descent of the coal at the shorter side of the chute causes the lumps to strike the active conveyer with considerable force and this is particularly objectionable in handling bituminous or semi-bituminous coal when it is desirable to retain the coal in lump sizes. These lumps of comparatively soft coal striking the active conveyer with considerable force, would be broken into less desirable sizes.

One of the objects of the instant invention is to provide means for closing the space between the oblique discharge lip of the inclined chute and the active conveyer without warping the chute, thereby avoiding the objectionable features of the warped structure. In the instant invention means are provided for guiding that part of the active conveyer adjacent to the chute so that it travels in a path in close proximity and parallel to the oblique discharge lip of the chute with the lip extending diagonally across the active conveyer, the transverse direction of the active conveyer being horizontally maintained. The particular means employed for the purpose are described hereinafter, pointed out in the appended claims, and illustrated by the accompanying drawings.

In the accompanying drawings, in which similar reference characters designate corresponding parts, Figure 1 is a perspective view of a combined chute and active conveyer embodying the invention, only so much of the two members being shown as is necessary to illustrate the device, Figure 2 is a side elevation of the same, Figure 3 is a sectional view on the line 3—3 of Figure 2, Figure 4 is a detail view, showing a side elevation of part of the upper run of the active conveyer, and Figure 4ª is a plan view of the same.

Figure 5 is a plan view, showing the lower end of the chute extending across the active conveyer.

Referring to the drawings in detail, 10 designates the endless belt of the active conveyer; this belt comprises the slats 11 carried by the sprocket chains 12, bights of which are engaged by the sprocket wheels 13 fixed on the shaft 14, provided with suitable means (not shown) for driving the belt in the direction indicated by the arrows *a*. At the opposite ends of the slats are the rollers 15 mounted between the links of the sprocket chains; these rollers, in the upper run of the belt, travel on the track elements 16 and 61, respectively, secured to the frame members 17 and 18, the tracks and rollers serving to maintain the upper run of the belt in its proper paths of travel. Mounted on the frame members are the shields 19 projecting over the sprocket chains and rollers; these shields not only guard the enclosed parts against clogging by the material being carried, but they also project above and over the ends of the slats to confine the material to the travelling surface of the belt. Except as hereinafter pointed out, the active conveyer is of well known construction as indicated in the foregoing brief description.

The chute 20, in the main, is of the usual construction, and may include a screen 21 to operate in the usual manner. The chute is inclined so that coal will flow down the same by gravity. Extending along the longitudinal edges of the chute are the opposite upstanding flanges 22 to confine the descending coal to the inclined face of the chute. The lower end of the chute is declined over the upper run of the active conveyer and the longitudinal axes of the chute and conveyer are respectively included in vertical planes that are normal to each other. The lower end of the chute extends across the active conveyer and the intersecting lines indicated by the sides of the lapped members form a quadrilateral, as shown in Figure 5. At the lower end of the chute is the discharge lip 23—24, extending approximately diagonally across the indicated quadrilateral. The bottom of the lower part of the chute is flat and is included in a plane extending approximately parallel to the longitudinal axis of the chute. The discharge lip 23—24 extends obliquely across the chute and the straight edge of the lip is inclined upwardly from the horizontal from the corner 24 toward the corner 23. The lower ends of the side flanges 22 are curved inwardly, as at 25, with their extremities coincident with the extremities of the discharge lip 23—24. The inwardly turned flanges 25 tend to restrain the downward rush of the coal at the sides of the chute and they also serve to direct the coal inward from the longitudinal edges of the active conveyer. The discharge end of the chute opens onto the active conveyer in the direction toward which travels the upper run of the conveyer and the obliquity of the discharge lip 23—24 feeds the material across the active conveyer to insure a uniform distribution of the load on the travelling belt.

The general direction of the active conveyer is horizontal and should this direction be maintained past the chute, the horizontal plane of the working face of the upper conveyer run would extend adjacent to the lower corner 24 of the vertically inclined discharge lip and there would be considerable space between the upper corner 23 and the working face. Instead of closing this intervening space by warping the chute as in ordinary practice, in the instant invention means are provided for changing the travel of the active conveyer past the discharge end of the chute so that the working surface of the upper run travels parallel to and in close proximity to the discharge lip 23—24. This is accomplished by inclining a section of the active conveyer, including the frame members 18 and the adjacent track sections 61, so that the endless carrier 10 travels in a plane parallel and adjacent to the discharge lip 23—24. In this change of direction of the endless belt the slats 11 thereof are maintained in a horizontal position. With the adjacent part of the active conveyer travelling in close relation and parallel to the edge of the discharge lip 23—24 of the chute, the coal passes directly from the chute to the active conveyer without acceleration and consequent fracture. After the active conveyer passes the lower end of the chute, it is guided by the frame members 17 and tracks 16 to travel in a horizontal direction for the purposes of inspection and transport of the coal to a place of deposit.

While the active conveyer has been described as one comprising slats carried by sprocket chains, yet it may consist of a flat fabric belt or an endless carrier of any other construction suitable for the purpose. Also, the chute has been described as one feeding by gravity, but it may be of the shaker or any other type that will meet with the requirements of the work to be performed.

What I claim is:—

1. In a conveying apparatus, the combination of an inclined chute having a discharge lip extending diagonally across the same and with its edge lengthwise inclined from the horizontal, with an active conveyer extending beneath the discharge end of the chute, said chute and said active conveyer having their longitudinal axes respectively included in vertical planes approximately normal to each other, said active conveyer including a flexible carrying element travelling in a path parallel and adjacent to the inclined edge of the discharge lip of the chute, and means maintaining the flexible carrying element in close proximity to the discharge lip of the chute and with said element horizontally disposed in a transverse direction.

2. In a conveying apparatus, the combination of an inclined chute having a discharge lip extending diagonally across the same and with its edge lengthwise inclined from the horizontal, said chute having sides inwardly turned at their lower ends to terminate at the opposite ends of the discharge lip of the chute, with an active conveyer extending beneath the discharge end of the chute, said chute and said active conveyer having their longitudinal axes respectively included in vertical planes approximately normal to each other, said active conveyer including a flexible carrying element travelling in a path parallel and adjacent to the vertically inclined edge of the discharge lip of the chute, the discharge lip and the lower extremities of the sides of the chute terminating within the longitudinal edges of the flexible carrying element.

3. In a conveying apparatus, the combination of an active conveyer mounted to travel mainly in a horizontal direction, with a chute declined to feed onto the active conveyer, said active conveyer and said chute having their longitudinal axes respectively included in vertical planes approximately normal to each other, said chute having a discharge lip extending obliquely across the same and said lip extending diagonally across the active conveyer, said chute also having sides with inwardly turned lower ends terminating with the ends of the discharge lip, and means for diverting the course of the active conveyer beneath the discharge end of the chute to travel a path parallel to the obliquely inclined lip of the chute, the discharge lip and the lower extremities of the sides terminating within the longitudinal edges of the active conveyer.

4. In a conveying apparatus, the combination of an inclined chute having a discharge lip extending obliquely across its lower end with the edge of the lip inclined lengthwise from the horizontal, with an active conveyer approximately normal to the chute and extending beneath the lower end of the chute with the discharge lip of the chute extending diagonally across the active conveyer, and means for diverting the course of the active conveyer to travel parallel to the vertically inclined edge of the lip with the conveyer horizontally disposed in a transverse direction.

5. In a conveying apparatus, the combination of an inclined chute having a discharge lip extending obliquely across its lower end with the edge of the lip inclined lengthwise from the horizontal, with an active conveyer approximately normal to the chute and extending beneath the lower end of the chute and including a flexible carrying element travelling in a path parallel and adjacent to the inclined edge of the discharge lip of the chute and with said lip extending diagonally across the carrying element, and means maintaining the flexible element in close proximity to said lip and also maintaining said element horizontally disposed in a transverse direction.

6. In a conveying apparatus, the combination of an active conveyer mounted to travel mainly in a horizontal direction, with a chute declined to feed onto the active conveyer, said active conveyer and said chute having their longitudinal axes respectively included in vertical planes approximately normal to each other, said chute having a discharge lip extending diagonally across the active conveyer with the edge of the lip lengthwise vertically inclined, and means for diverting the course of the active conveyer beneath the discharge end of the chute to travel a path parallel to the vertically inclined edge of the lip, with the conveyer horizontally disposed transversely of the same.

7. In a conveying apparatus, the combination of an inclined chute having a flat bottom at its lower part included in a plane approximately parallel with the longitudinal axis of the chute, said chute having a discharge lip extending obliquely across the lower extremity of the flat bottom with the edge of the lip inclined lengthwise from the horizontal, with an active conveyer normal to the chute and extending beneath the lower end of the chute with the discharge lip of the chute extending diagonally across the active conveyer, and means for guiding the active conveyer to travel parallel and closely adjacent to the vertically inclined edge of the lip with the conveyer horizontally disposed in a transverse direction.

8. In a conveying apparatus, the combination of an inclined chute having an oblique discharge lip at its lower end, the edge of the lip being vertically inclined lengthwise of the same, with a flexible active conveyer extending longitudinally beneath the lower end of the chute, said active conveyer also extending in a horizontal direction beneath the lower end of the chute with the vertically inclined discharge lip of the chute projecting diagonally across the active conveyer, and means for diverting the course of the flexible active conveyer to travel in close relation and approximately parallel to the vertically inclined edge of the chute lip.

In testimony whereof I affix my signature.

MALCOLM L. O'NEALE.